United States Patent
Holmes et al.

(10) Patent No.: US 8,658,265 B2
(45) Date of Patent: Feb. 25, 2014

(54) MOULDED ARTICLES AND PROCESS FOR MAKING THE SAME

(75) Inventors: Mark Tom Holmes, Knutsford (GB); William Barry Jones, Bromley (GB)

(73) Assignees: AB Agri Limited, Lynch Wood, Peterborough (GB); 3B Solstar Limited, Timperley, Cheshire (GB)

( * ) Notice: Subject to any disclaimer, the term of this patent is extended or adjusted under 35 U.S.C. 154(b) by 0 days.

(21) Appl. No.: 13/635,234

(22) PCT Filed: Mar. 16, 2011

(86) PCT No.: PCT/GB2011/000367
§ 371 (c)(1),
(2), (4) Date: Dec. 31, 2012

(87) PCT Pub. No.: WO2011/114101
PCT Pub. Date: Sep. 22, 2011

(65) Prior Publication Data
US 2013/0115397 A1    May 9, 2013

(30) Foreign Application Priority Data
Mar. 16, 2010  (GB) .................................. 1004371.9

(51) Int. Cl.
*B27M 3/00*    (2006.01)

(52) U.S. Cl.
USPC ............. 428/35.6; 162/99; 162/148; 162/150

(58) Field of Classification Search
USPC ............................ 428/35.6; 162/99, 148, 150
See application file for complete search history.

(56) References Cited

U.S. PATENT DOCUMENTS

| | | | | |
|---|---|---|---|---|
| 2,013,326 | A | * | 9/1935 | Wilkins ........................ 220/4.06 |
| 4,832,791 | A | * | 5/1989 | Detert et al. ..................... 162/99 |
| 4,882,190 | A | * | 11/1989 | Olson et al. ..................... 426/541 |
| 5,416,139 | A | * | 5/1995 | Zeiszler ........................... 524/13 |
| 6,074,856 | A | * | 6/2000 | Wong et al. .................... 435/139 |
| 2013/0115397 | A1 | * | 5/2013 | Holmes et al. ................ 428/35.6 |
| 2013/0199743 | A1 | * | 8/2013 | Lee et al. ...................... 162/149 |

FOREIGN PATENT DOCUMENTS

| | | | |
|---|---|---|---|
| EP | 0644293 | * | 3/1995 |
| EP | 1176174 | * | 1/2002 |
| WO | WO0220667 | * | 3/2002 |

* cited by examiner

*Primary Examiner* — N. Edwards
(74) *Attorney, Agent, or Firm* — MacMillan, Sobanski & Todd, LLC

(57) ABSTRACT

A molded article comprising sugar beet pulp is provided. In addition a method of making the such molded articles is described. Such articles are particularly useful in the packaging of food; and for medical applications where molded articles are needed.

13 Claims, 1 Drawing Sheet

MOULDED ARTICLES AND PROCESS FOR MAKING THE SAME

Figure 1:
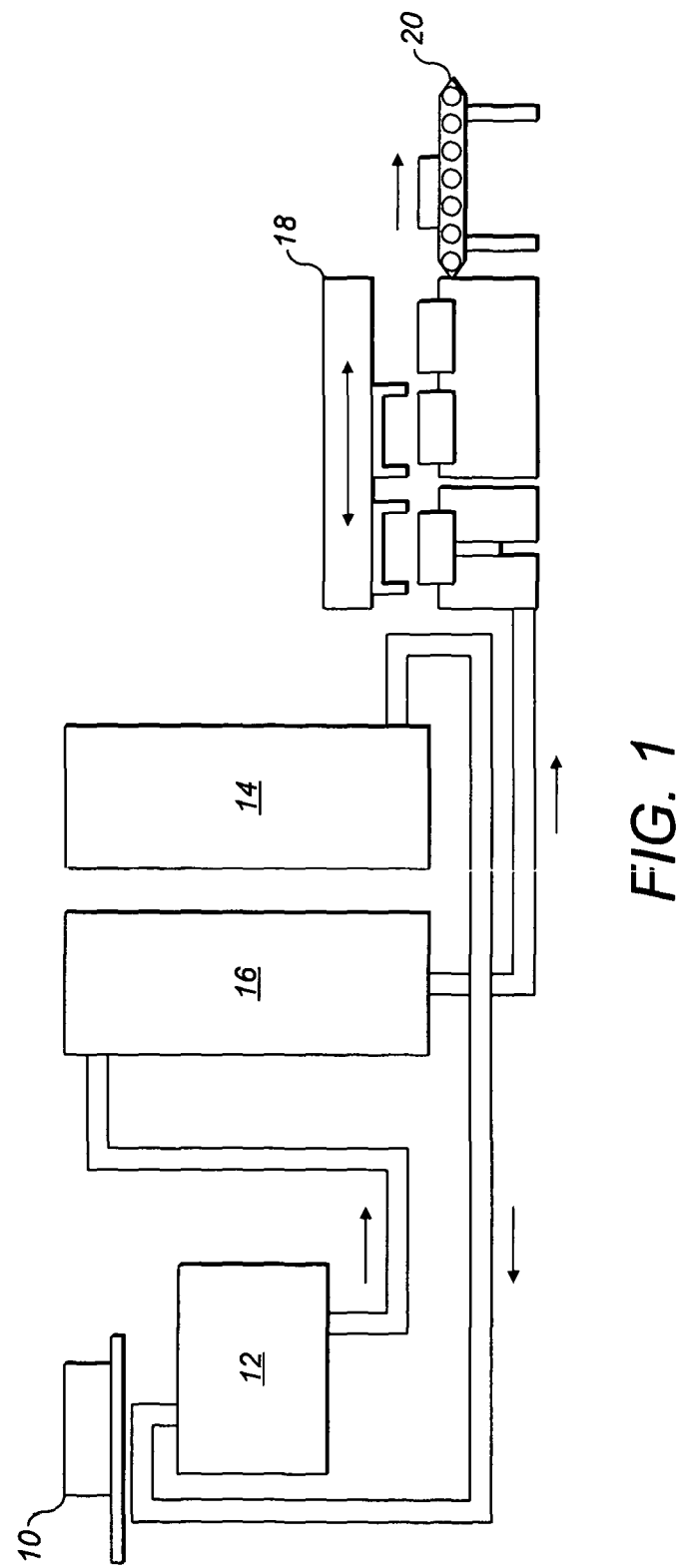

The present invention claims the benefit of the PCT/GB2011/000367 filed Mar. 16, 2011, which claims priority to GB Application No. 1004371.9 filed Mar. 26, 2010.

This invention relates to moulded articles and to a process for making the same. More particularly, the invention relates to moulded fibre articles.

The invention is especially concerned with moulded articles made from fibres derived from plant matter, especially "pulp". In this specification the term "pulp" refers to the cellulose-containing plant matter which remains after the plant has been subjected to a process, often referred to as "co-products". The pulp may be considered as a by product of that process. In this patent "pulp" is that material which remains after a plant material has been subjected to another, unrelated primary process, not pulp as conventionally defined in the pulp and paper trade as being material that is the primary product of a primary process, for instance, the chopping down of trees, their pulping and forming into paper, card, board etc.)

Moulded pulp articles have many uses. These include (not exhaustively) drink trays, cup carriers, wine shippers, pulp bedpan liners, pulp urinals, slipper pans, commode pans, and food and beverage packaging including egg cartons, egg trays, fruit trays, sandwich containers etc.

One of the biggest uses of moulded pulp is in food and beverage packaging. This is a vast industry. In 2007, the world market for food and beverage packaging was estimated to be about $310 billion dollars, with the U.S., Europe and Asia accounting for 90 percent.

Within the industry there is a big drive to reduce the cost of the material wastage associated with food packaging whether this is derived from a moulded pulp source or a chemical or petrochemical source and to reduce the adverse environmental impact of products used in the industry.

This is particularly relevant to the pre-made food market. There is an increasing demand for new, cheap, readily recyclable and biodegradable packaging materials for sandwich, salads, ready meals, fruit, vegetables, meat etc. In particular, there is a desire to substitute trays and products currently produced from a chemical or petrochemical source with those made from a more sustainable substrate.

Moulded pulp is considered a sustainable packaging material, since it is often produced from recycled materials, and can be recycled again after use. Moulded pulp or molded fibre articles are typically made from 100% recycled corrugated fiberboard and newspaper. However other forms and sources of pulp can be used.

New and more environmentally sound sources of fresh pulp for such moulded articles offer a way of still further reducing the impact on the environment of these products. Sugar beet (*Beta vulgaris*), a member of the *Chenopodiaceae* family, is a plant whose root contains a high concentration of sucrose. It is grown commercially for sugar production. It is directly related to the beetroot, chard and fodder beet, all of which are descended by cultivation from the sea beet.

Sugar beet is a hardy biennial plant that can be grown commercially in a wide variety of temperate climates. During its first growing season, it produces a large (1-2 kg) storage root whose dry mass is typically 15-20% sucrose by weight.

The European Union, the United States, and Russia are the world's three largest sugar beet producers, although only the European Union and Ukraine are significant exporters of sugar from beets. The U.S. harvested 1,004,600 acres of sugarbeets in 2008 alone. At that time, beet sugar accounted for 30% of the world's sugar production.

To extract the sugar, the beet roots are washed, mechanically sliced into thin strips called cossettes, and passed to a machine called a diffuser to extract the sugar content into a water solution.

After the sugar has been extracted the remaining used cossettes or pulp, leaves the diffuser at about 95% moisture but low sucrose content. Using screw presses, the wet pulp is then pressed down to typically 70-75% moisture.

This sugar beet pulp material is produced on a vast scale wherever beet sugar is produced and its main uses are as an animal feed, where the pulp may be sold as a moist material or further dried with the optional addition of molasses and either sold as dried shreds or further processed into pellets.

Finding further uses for this pulp would be highly desirable as it is a natural co-product, produced locally, in most Western countries.

Alternative uses for the pulp have been investigated. These include bio-gas production and paper production.

Paper products produced from sugar beet pulp would be very environmentally friendly as they would utilise what is currently a co-product from a primary process and would also give rise to naturally degradeable products.

However sugar beet pulps are known to be very difficult to use directly in paper making. The reason for this is that the sugar beet pulps contain small quantities of cellulose and additionally the residual cell components of the pulp released during refining makes it difficult to obtain a high quality, free-draining stock required for traditional paper making techniques.

Typically sugar beet pulp comprises only between 19-32% cellulose by dry weight. Other significant components are pectins at between 15-44% by dry weight and hemicelluloses at between 18-42% by dry weight.

There have been some attempts in the patent literature to use modified and treated sugar beet pulp to form paper.

EP 0644293 describes a method of manufacturing a paper or cardboard comprising dried sugar beet fibre. The paper comprises from 1 to 50 wt % of the sugar beet pulp. The sugar beet pulp has to be dried and ground before being added to the cellulose mix to form the paper.

U.S. Pat. No. 6,074,856 describes the use of fermented sugar beet pulps in the making of paper or cardboard. The paper or cardboard may contain up to 50 wt %, but preferably between 2 and 25 wt % of the sugar beet pulp. The fermenting process modifies the fibres in the pulps, making them more suitable for paper making.

These prior art processes are not ideal as they can only produce paper comprising a maximum of 50 wt % sugar beet pulp.

It should be noted that paper is not a moulded article, and the problems involved in producing paper are quite different from those in moulded articles. Simply put, a moulded article is any article that has been formed in a mould as opposed to being "formed" on a paper machine wire.

EP1176174 discloses containers and packaging materials which are degradable. According to the disclosure, the degradable material is bagasse, beet pulp, potato skin and shells or stalks of rice, wheat, corn, Chinese sorghum, peanut and coconut. Rice husk, wheat stem and potato skin are exemplified. The degradable material contains 30 wt % to 90 wt % of a plant fibre and 10 wt % to 60 wt % of a modified urea-formaldehyde resin. The process to make the material requires high temperatures and pressures and the thermoset resin acts to bind together the material. The material formed by this process is not both degradable and compostable.

US2007/0292643 discloses a degradable composition comprising a matrix of foamed gelling hydrocolloid system and a fibrous material embedded within the matrix and a firming agent embedded within the matrix. A wide range of different fibrous materials are disclosed. Example 27 discloses a moulded article using sugar beet. According to the example, "the formulation was less than satisfactory but could easily be adjusted and indicates that beet pulp is a viable additive." There is no disclosure of how to adjust the formulation to produce a satisfactory product. The material formed by this process is not both degradable and compostable.

WO97/32792 discloses the use of a paper material, whose pulp consists at least partially of a fibrous material of vegetable origin, to manufacture food containers, such as trays. The paper material may be maize paper, citrus paper of sugar beet paper. Sugar beet paper contains about 5-10 wt % sugar beet. The material formed by this process is not both degradable and compostable.

U.S. Pat. No. 5,849,152 relates to a process for the production of a shaped body of a biodegradable material. The process involves providing a viscous mass comprising a biodegradable fibre material, water and starch, and baking the mass. The fibrous material may be waste paper, wood dust, paper dust or beet slices. The material formed by this process is not both degradable and compostable.

GB425515 discloses a process of making animal food from beet pulp. There is no disclosure of making containers from beet pulp.

EP1176174, US2007/0292643, WO97/32792 and U.S. Pat. No. 5,849,152 disclose the use of sugar beet pulp as one of many options, indicating that the inventors regarded sugar beet as being equivalent to many other fibrous material. We have found that all fibrous materials cannot necessarily be considered as equivalent, and in the case of sugar beet, for example, it is not possible according to the prior art to provide a sugar beet product, containing high levels of sugar beet, which is also degradable, compostable, and which meets the functional needs of the product, such as sufficient strength, acceptable appearance, and so on.

It is not straightforward to produce an acceptable quality of moulded article from sugar beet pulp. Traditional pulping methods involving a conventional "wet pulp" have not been successful. Such methods involve refining a wet pulp, and, using such methods, it is generally only possible to produce articles containing sugar beet as a filler in amounts of 5-10 wt % A feature of this patent is that the dried sugar beet pulp shreds are subjected to a grinding stage before the addition of dilution water. The requirement for refining is significantly reduced to a mild brushing which is sufficient to deliver the required dispersion of fibrous material whilst retaining an acceptable drainage of the stock. This allows the sugar beet pulp to be used in much larger proportions of the final product.

We have now found a way to produce moulded articles containing sugar beet pulp. Furthermore, although the moulded articles may contain less than 50 wt % sugar beet pulp, the invention makes it possible to produce moulded articles containing 50 wt %, or more, sugar beet pulp.

According to one aspect of the invention there is provided a moulded article comprising sugar beet pulp. The moulded article is especially useful as a tray or other receptacle.

Advantageously, the moulded article comprises at least 50 wt % sugar beet pulp, more preferably more than 50 wt % sugar beet pulp.

In another aspect of the present invention there is provided a method of making a moulded article comprising the steps of:

1) drying sugar beet pulp;
2) grinding the dried sugar beet pulp;
3) mixing the ground sugar beet pulp with water to form a slurry;
4) treating the slurry with one or more treatment agents;
5) transferring at least a portion of the treated slurry to a mould; and
6) drying the moulded slurry to form the moulded article.

It is an advantageous feature of the invention that the grinding of the dried sugar beet pulp (which is typically in the form of shreds) is carried out before the sugar beet pulp is mixed with water to form a slurry.

After treating the slurry, and before transferring it to a mould, the slurry is preferably subjected to a refining step, which is desirably carried out gently. This involves imparting mechanical action to pulp fibres in order to alter their cell wall structure. Refining apparatus are well known in the art, and the refining step in the invention may be carried out using a conventional apparatus.

Typically in the drying step 1), the sugar beet pulp is dried to above 80% by weight dry matter, more preferably 80 to 95% by weight dry matter. Most preferably, the sugar beet pulp is dried to 86 to 90% by weight dry matter, especially 88% by weight dry matter.

The moulded articles according to the invention may be produced by conventional moulding processeses, such as by a "press to dry" process or by a "thermoform" process. However, we have developed certain improvements to the conventional process to make it exceptionally suitable for making sugar beet moulded articles.

The dry grinding step preferably reduces the length of the sugar beet pulp shreds to a mean length of about 10 mm, at most, and preferably 5 mm at most. The pulp shreds initially have a length of 15 to 25 mm, and we have found that grinding the pulp to shorten the shreds significantly increases the amount of sugar beet pulp that can be used in the container, whilst maintaining a good quality of container. The grinding is preferably carried out using a slicing/cutting action.

The fibres are preferably treated such that they have a Canadian Standard Freeness (CSF) of 300 to 500, preferably 350 to 450 and more preferably 380 to 420. A CSF of about 400 is especially preferred. The treatment of the fibres to achieve the desired CSF can be achieved via conventional means, such as by the grinding step in combination with subsequent slurrying and refining. What is important is that the fibres of the treated slurry transferred to the mould have a CSF in the desired range.

The treatment step 4) preferably includes a step of treating the slurry with a dispersion agent (suitable dispersion agents are often known in the art as "softening" or "debonding" agents).

Preferably the dispersion agent comprises a quaternary compound, such as a quaternary ammonium compound. Suitable quaternary ammonium compounds include dihydrogenated tallow dimethylammonium chloride (trade name Arquad 2HT 75 or Noramium M2SH-1); an ester quaternary ammonium compound such as di-(noroleylcarboxyethyl)hydroxyethylmethylammoniummethosulphate (trade name Rewoqaut WE 15). Also imidazoline quaternary compound may be used, such as 1-methyl-2-noroleyl-3-oleicacidamidoethylimidazoliniummethosulfate (trade name Rewoquat W3690)

The quaternary compounds are typically made into an aqueous emulsion or blended with a surfactant, especially a surfactant ester, such as a polyethylene glycol ester, e.g., polyethylene glycol 400 dioleate In certain embodiments, the dispersion agent contains a modified siloxane to enhance flexibility of the finished item.

The amount of the dispersion agent is typically in the range 0.5 to 1.5 kg per tonne of slurry.

The treatment step preferably includes a step of treating the slurry with a sterilising agent. Preferably the sterilising agent comprises chlorine dioxide. A suitable commercially available product is available under the trade name eTwinOxide™. This process has not previously been applied to the manufacture of moulded articles. This sterilising agent has an antibacterial effect. It has an advantage in that it does not produce free chlorine or the often associated problematic compounds THM (Tri HaloMethanes) and AOX (Adsorbable Organic Halides).

Prior to step 5), preferably prior to step 4) the sugar beet may be mixed with other desired materials, such as filler.

In a preferred embodiment, a material is added to impart resistance to fats, grease and/or oil. This material may suitably be added in step 4 as one of the treatment agents. This material is preferably a fluoroacrylate copolymer, such as the polymers available from KAPP-CHEMIE GmbH & Co. KG under the trade designation KAPPAPHOB P C6. This material is preferably added in an amount from 0.5 to 2.0 wt %, based on the weight of sugar beet fibre.

In an embodiment, a promoter may be added before the fat/grease/oil resistance material. A typical promoter is polyaluminium chloride, and would be added in an amount of 0.5 to 1.0 wt % based on the weight of sugar beet fibre. A suitable example of the promoter is the product available from Feralco UK Ltd under the trade designation PLUSpac500.

The moulded articles of the present invention can be made in any thickness desired. The thickness will be determined by the application desired for the article.

The moulded articles of the present invention are preferably food trays, or other food receptacles, such as food packaging. The moulded articles are particularly useful as trays or receptacles for premade food.

The moulded articles of the present invention preferably comprise greater than 50% by weight of sugar beet pulp. In certain embodiments, the moulded articles according to the invention contain: at least 10 wt %, at least 20 wt %, at least 30 wt %, or at least 40 wt % of the total weight of the moulded articles.

More preferably the moulded articles of the present invention comprise from 55 to 100% by weight of sugar beet pulp. More preferably, the moulded articles of the present invention comprise from 65 to 99% by weight of sugar beet pulp. Most preferably, the moulded articles of the present invention comprise from 70 to 99%, still more preferably 70 to 95%, by weight of sugar beet pulp.

In some embodiments the material used in the moulded articles may consist entirely of sugar beet pulp. However, in other embodiments the sugar beet pulp may be supplemented with other fibre sources. For certain moulded articles this may be desirable, to provide different structural and physical properties.

The other fibres may be from any additional source, provided they do not affect the compostability and degradability of the moulded article. Non limiting examples of such fibres are wood fibres from: recycled paper, virgin wood fibres, cotton fibres, card fibres or any mixture thereof.

Once formed, the moulded articles may be used without further modification. For certain articles and their applications, however, the moulded articles may undergo finishing treatments or processing before use, which is generally in addition to the basic production procedure.

Finishing treatments or processing may, for example, comprise; a coating, printing, hot-pressing, die-cutting, trimming or manufactured using colours or special slurry additives.

A preferred finishing treatment would be the application of a chemical coating. The chemical coating may provide for example a water proof barrier, oil/grease resistance, antibacterial properties or a mixture thereof. Any conventional coating material used in coating moulded articles may be used, provided, of course, that it is compatible with the sugar beet and other materials in the moulded article.

It should be noted that when the grease/fat/oil resistant material described above is added, it may no longer be necessary to provide any further surface barrier on the article, particularly for some end uses where shorter contact times or life cycles are involved Preferably the moulded articles for use as food packaging are treated with a chemical coating that is food contact approved.

Particularly preferred moulded articles include premade food packing. Non limiting examples include: Ready Meal Trays, Fruit/Veg Trays and Meat Trays, egg boxes and pizza boxes.

A dye may be included during processing to provide the moulded article with any desired colour.

The present invention makes it possible to produce moulded articles containing high quantities of sugar beet, which have the required strength, rigidity and appearance and which are also degradable and compostable.

The moulded articles according to the invention meet the standards of BS EN 13432:2000. A moulded article which complies with this standard is both degradable and compostible, and that it meets the Evaluation criteria set out in Annex A of BS EN 13432:2000; this means, inter alia, that:
(1) Specific requirement for the compostability of the moulded article (see BS EN 13432:2000, Annex A.3; test method, e.g., ISO16929)
(2) Specific requirement for the compostability of the moulded article (see BS EN 13432:2000, Annex A.2; test method, e.g., ISO14855)
(3) the moulded article must meet strict limits for heavy metal content (see BS EN 13432:2000, Annex A.1.
(4) the compost resulting from the moulded article must be safe for the environment. Toxicity tests use plant seedlings & earthworms (see BS EN 13432:2000, Annex A.4; test methods, e.g., OECD 208A, OECD 207)

This it is a preferred feature of the invention that the moulded article meets the standards of BS EN 13432:2000.

It is preferred that the moulded article does not contain any thermosetting polymer, as this will detract from the degradability and compostability of the product. In particular, it is preferred that the product does not contain any urea-formaldehyde resin, especially any of the modified urea-formaldehyde resins described in EP1176174 the contents of which are incorporated by reference.

It is preferred that the moulded article does not contain a foamed gelling hydrocolloid system, especially a foamed gelling hydrocolloid system as described in US2007/0292643 the contents of which are incorporated by reference.

It is preferred that the moulded article does not contain any starch, or if it does contain starch, it is preferred that there is less than 15 wt % starch, based on the dry weight of the sugar beet (i.e. less than the amount described in U.S. Pat. No. 5,849,152 the contents of which are incorporated by reference).

EXAMPLE OF THE PROCESS

The process for producing moulded articles according to the invention will now be described with reference to FIG. 1, which is a schematic diagram showing a press to dry process applied to the present invention.

First the wet sugar beet pulp is dried to remove excess moisture. Any drying technique may be employed to achieve this.

Preferably a low temperature drying process is employed. The low temperature drying method yields sugar beet pulp that is easier to manage in the pulping process. High temperature drying of the beet pulp can produce a hard outer layer to the sugar beet pulp shreds. This can give rise to wetting problems during the later pulping stage in the inventive moulding process. Additional dispersing or pulping agents may be required to prepare an effective pulp slurry. However high temperature dried beet pulp can still be used to form high quality moulded articles of the present invention Once dried, the dried beet pulp is fed to a grinder. The grinding may be carried out at room temperature. The grinding may provide sugar beet pulp particles with a length under 5 mm and a CSF of about 400 when subsequently slurried and refined.

The grinding may be carried out by any known grinding process, but grinding processes that have a slicing/cutting action are preferred.

Referring to FIG. 1, the ground sugar beet pulp is transferred from a hopper 10 to a pulper 12. A sterilising agent (preferably the TwinOxide™ system) is fed to the pulper 12 from the tank 14. A dispersion aid is also added to the pulper. In addition a material to impart resistance in the fibres to grease, fat and/or oil may be added to the pulper 12.

The treated pulp from the pulper 12 is fed to a stock tank 16, from where, following gentle refining, it is fed to the moulding apparatus 18. In the moulding apparatus 18, the sugar beet pulp is pressed and dried into the desired shape. The moulding apparatus 18 may be entirely conventional. From the moulding apparatus 18, the sugar beet moulds are passed to a conveyor 20.

If desired, a filler, such as bagasse or Kraft fibre may be added to the pulper 12. Other sources of fibre may be used. The additional fibre, if used, may be a blend of different fibres, or a single fibre type.

If used, prefereably the additional fibre will preferably constitute less than 50 wt % of the total weight of finished moulded article.

Typically the slurry will comprise between 0.1 and 20% of solids by weight of the slurry. Preferably the slurry will comprise between 0.5 and 10% of solids by weight of the slurry. More preferably the slurry will comprise between 1 and 7.5% of solids by weight of the slurry. Most preferably the slurry will comprise between 2.5 and 5% of solids by weight of the slurry.

The moulding process shown in FIG. 1 is a press to dry moulding process. The slurry is applied to the mould, formed into a solid structure, and transferred to another mould to be dried to form the finished article. No further drying is required when the article is removed from the mould.

The process may use release agents in the mould to allow for easy removal of the finished moulded product.

The invention is not limited to the moulding process shown in FIG. 1. Any moulding process known in the art may be substituted.

The finished moulded products may be coated to render them impervious to moisture or oils. The coating may be performed after the products have been ejected from the mould or while they are still in the mould. The coating may be applied by roller, spray, flexo or gravure.

Any known coating agent useful for moulded products may be used.

It will be appreciated that the invention may be modified within the scope of the claims.

The invention claimed is:

1. A moulded article for use as a tray or other receptacle, comprising at least 30 wt % dried ground sugar beet pulp, wherein said moulded article is obtainable for sugar beet fibres having a CSF (Canadian Standard Freeness) in the range 300 to 500.

2. A moulded article according to claim 1, for use in food, medical, horticultural or industrial applications.

3. A moulded article according to claim 1, for use in packaging.

4. A moulded article according to claim 1, in the form of a food container.

5. A moulded article according to claim 1, wherein the dried ground sugar beet pulp comprises between 50 and 100% by weight of the article.

6. A moulded article according to claim 1, wherein the dried ground sugar beet pulp comprises between 65 and 95% by weight of the article.

7. A moulded article according to claim 1, which has a protective coating.

8. A moulded article according to claim 7, wherein the protective coating provides a barrier layer to make the article water and/or oil and/or grease resistant.

9. A moulded article according to claim 1, containing a material dispersed therein which imparts resistance to grease, fat and/or oil.

10. A moulded article according to claim 1, which meets the standards of BS EN 13432.

11. A moulded article according to claim 1, which does not include a thermoset polymer.

12. A moulded article according to claim 1, where said moulded article is obtainable from sugar beet fibres having a mean fibre length of 10 mm or less.

13. A moulded article according to claim 1, where said moulded article is obtainable from sugar beet fibres having a mean fibre length of 5 mm or less.

* * * * *